United States Patent [19]

Janin

[11] 4,299,301

[45] Nov. 10, 1981

[54] RANDOM MOTION MECHANISMS

[76] Inventor: Pierre Janin, 42 rue de Savonnière, 28230 Epernon, France

[21] Appl. No.: 22,775

[22] Filed: Mar. 22, 1979

[30] Foreign Application Priority Data

Mar. 23, 1978 [FR] France .............................. 78 08432

[51] Int. Cl.³ ...................... B62D 11/04; A63H 17/00
[52] U.S. Cl. ...................................... 180/6.5; 46/211;
46/251; 46/254; 180/167; 273/1 E; 273/138 A;
318/16; 434/433
[58] Field of Search ................. 46/252, 251, 211, 254;
180/167, 6.5, 2, 79; 273/359, 138 A, 86 B, 85 G,
1 E; 35/1, 10, 8 R, 19 R; 272/35, 1 R; 318/16,
587; 434/433, 188, 226, 300, 305, 373, 379

[56] References Cited

U.S. PATENT DOCUMENTS

| | | | |
|---|---|---|---|
| 3,128,840 | 4/1964 | Barrett, Jr. ........................... | 180/167 |
| 3,602,508 | 8/1971 | Abercrombie ............. | 273/138 A X |
| 3,682,477 | 8/1972 | Harkins .............................. | 273/86 B |
| 3,748,564 | 7/1973 | Ohba ............................... | 180/6.5 X |
| 3,812,929 | 5/1974 | Farque ................................ | 180/167 |

Primary Examiner—Joseph F. Peters, Jr.
Assistant Examiner—Milton L. Smith
Attorney, Agent, or Firm—George E. Kersey

[57] ABSTRACT

Random motion mechanisms having at least one driving element that is operated at randomly varying speeds. One such mechanism is a self-propelled vehicle which has at least one randomly operated driving wheel. The vehicle desirably has a second randomly operated driving wheel, which is parallel with the first, and at least a third supporting element which can take the form of a wheel.

14 Claims, 2 Drawing Figures

RANDOM MOTION MECHANISMS

BACKGROUND OF THE INVENTION

This invention relates to random motion mechanisms, and, more particularly, to self-propelled randomly movable vehicles. In such mechanisms, displacement is determined by a number of different parameters, including direction, radius of curvature, and speed, providing a variety of random movements as a function of time. The trajectory of each such mechanism is realizable as a point trace.

Random motion mechanisms are usable in a wide variety of disciplines which deal with theoretical and experimental evaluations of chance events and occurrences. They are usable for the experimental simulation of behavior in the evaluation of hypothetical situations where the behavior includes an element of chance. They are also usable as a core element in games and in disciplines where chance occurrences are evaluated. Instead of indicating to the player or user the next movement to be made, the mechanism makes the movement spontaneously.

It is known from French patent No. 450,059 filed on Oct. 31, 1912 to employ vehicles which have a single, unpredeteremined stopping point, at the end of a course, where the trajectory is predetermined, for example, such as that provided by a circle. In this situation the only random element is the point of stopping and the position of stopping since the trajectory is predetermined.

In another French patent No. 75,24920 Aug. 11, 1975, a vehicle for providing random displacements is disclosed in which the wheels of the vehicle are simultaneously motorized and are simultaneously orientable. In this vehicle at least one of the motorized wheels is uniquely orientable and its axle is also orientable. This kind of random motion vehicle, in which one or several elements are orientable, provides a device which is relatively complicated and characterized by having an intricate mechanical construction.

Accordingly, it is an object of the invention to facilitate the realization of a suitable random motion mechanism for use in theoretical studies of chance occurrences as well as in realizing a game or toy which provides an element of chance as a part of the game plan. A related object is to realize a self-propelled vehicle which is usable in theoretical studies of random occurrences, as well as in the playing of games with an element of chance.

Another object of the invention is to provide a random motion mechanism in which a large number of parameters are controllable in a relatively unencumbered fashion. A related object is to realize not only a mechanism, such as a vehicle, which has random stopping points in its trajectory, but also one in which the trajectories themselves are variable. Another related object is to realize a wide variety of trajectories including trajectories with variable radii of curvature.

Another object of the invention is to realize a random motion mechanism which provides a wide variety of random operations without requiring the complexity of orientable wheels and orientable axles.

SUMMARY OF THE INVENTION

In accomplishing the foregoing and related objects, the invention provides a random motion mechanism, such as a self-propelled vehicle, in which at least one of the driving elements operates at randomly varying speeds.

In accordance with one aspect of the invention, there is provided a randomly movable vehicle with parallel driving wheels and each wheel is operable at randomly variable speeds. The speeds may be the same or different in the two cases.

In accordance with a further aspect of the invention, a random motion mechanism with two driving elements can be provided with independent driving motors to simplify the realization of random motion operation for the separate driving elements.

In accordance with still another aspect of the invention, the randomly varying driving mechanisms respond to controls of either the analog or digital type. In the case of analog servo-control, a command is provided by a voltage or current level taken with respect to a reference. It is also possible to use a servo-control which depends upon the variations in the frequency of a reference source. In any event, the voltage, the current, and the frequency of the command signals vary in random fashion over time.

In the case of two rolling elements which operate at respective linear speeds of rotation $v_1$ and $v_2$, it is possible to establish the conditions that apply to the trajectory of the mechanism incorporating the rolling elements in accordance with the following table:

| Ratio of Linear speeds of Rotation | Trajectory of the Mechanism |
| --- | --- |
| $v_1/v_2 = 1$ | Straight line |
| $v_1/v_2 = 1$ | A point, with the mechanism pivoting on itself. |
| $v_1/v_2 = 1$ or $-1$ in succession | An interrupted straight line trajectory. |
| $v_1/v_2$ is a constant other than 1 or $-1$ | A circle with a radius R equal to d times the ratio of $(1 + v_1/v_2)$ to $(1 - v_1/v_2)$, where d is the distance between the rotating elements. |
| $v_2/v_2$ is variable | A course of variable radius of curvature with a discontinuity in the trajectory for each non-progressive change of the ratio $v_1/v_2$. |

When the mechanism includes driving elements which operate at different speeds, the mechanism is displaced along a curve of which the radius of curvature is itself variable. When the speed of one of the driving elements varies in random fashion, the trajectory of the mechanism, for example, a self-propelled vehicle, is a trajectory with a random radius of curvature.

The radius of curvature can have two extreme values: a value of zero and a value of infinity. When the radius of curvature is zero the rolling or driving elements turn at the same speed and in an inverse sense, which results in a pivoting of the mechanism on its vertical axis of symmetry. When the radius of curvature is infinite the driving or rolling elements rotate at the same speed in the same sense and provide their associated mechanism or vehicle with a displacement along a straight line.

In accordance with another aspect of the invention, the regulatory mechanism that is used to operate the driving elements can be used to modify the characteristics of the trajectory. Thus it is possible to predetermine the following major characteristics; it being understood that the predetermination of one characteristic neither excludes nor includes the predetermination of others:

The maximum value of the speed $v_1$ and/or the speed $v_2$;

The average duration T of the lapse of successive random time intervals during which the driving elements adopt a given value of speed;

The average dispersion of the lapse of time about their average time T;

The average dispersion of the average duration T when the latter is subject to chance variations.

The effect of the preceeding determinations can be extended to the following specific cases:

The average duration $T_{oo}$ of the lapse time during which the self-propelled vehicle has a straight trajectory because of the radius of curvature has become infinite, i.e. the ratio $v_1/v_2$ is equal to one;

The average dispersion of the lapses of time about the average $T_{oo}$ and further:

The average duration $T_o$ of the lapse of time during which a self-propelled vehicle pivots in place because the radius of curvature has become null, i.e. the ratio $v_1/v_2$ is equal to $-1$ or the equivalent which is $v_1 = -v_2$;

The average dispersion of the lapse of time about the average $T_o$, and further;

The average duration $T_a$ during which the self-propelled vehicle or mechanism is stopped because the speed of the two elements are simultaneously null;

The average dispersion of the lapse of time during the average time $T_a$.

It will be understood that it is equally possible to regulate the average dispersion of the average duration $T_{oo}$, $T_o$ or $T_a$ in the case where these times are also subject to chance variations.

DESCRIPTION OF THE DRAWINGS

Other aspects of the invention will become apparent after consideration of several illustrative embodiments, taken in conjunction with the drawings in which.

DETAILED DESCRIPTION

Figure 1:
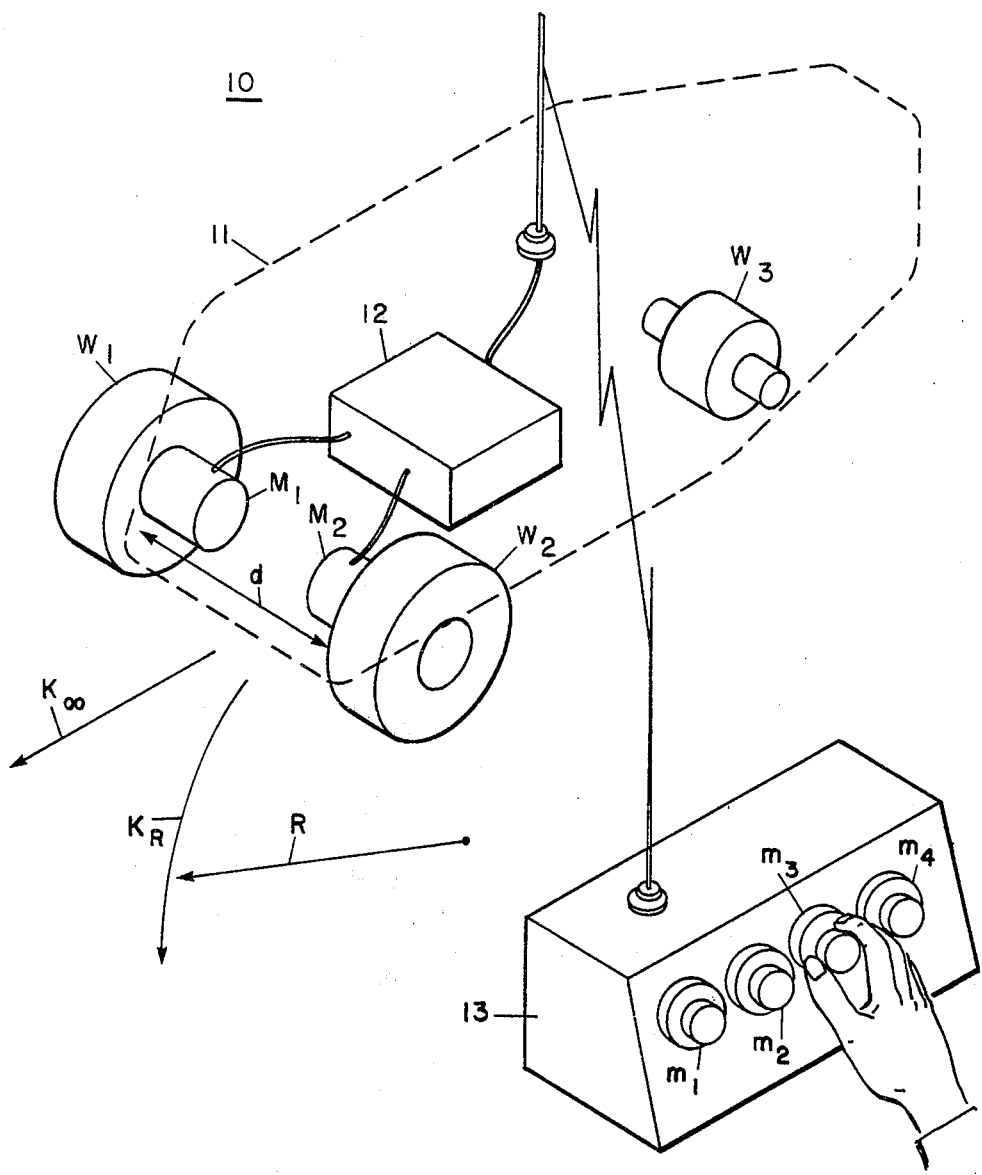
FIG. 1 is a perspective view of a random motion mechanism in the form of a self-propelled randomly movable vehicle in accordance with the invention.
Figure 2:
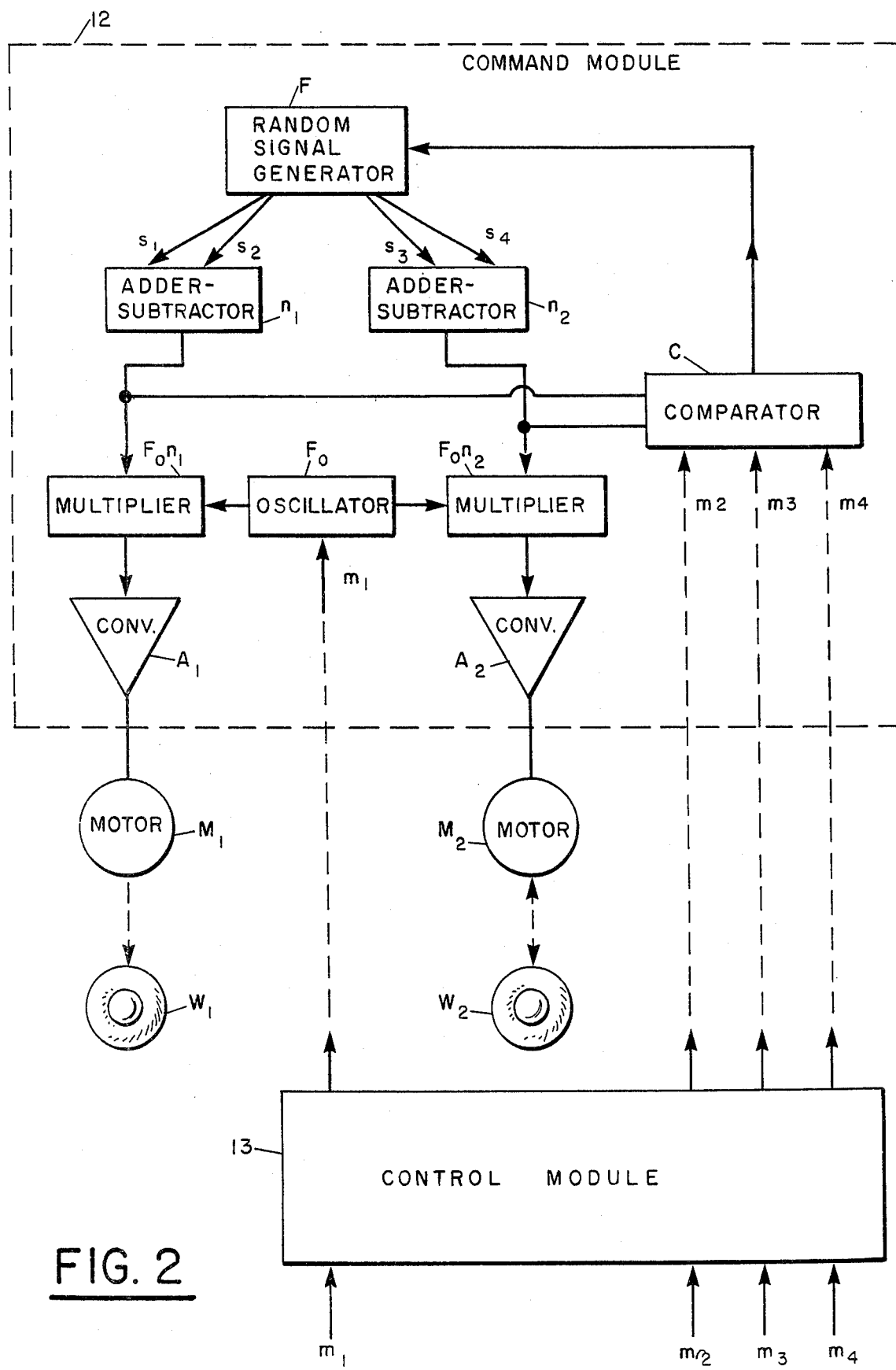
FIG. 2 is a block and schematic diagram of the control circuitry for the mechanism of FIG. 1.

With reference to the drawings, FIG. 1 shows a self-propelled mechanism 10 in the form of a vehicle that is controlled in accordance with the invention. It will be appreciated that the mechanism of FIG. 1, as well as the accompanying circuit schematic diagram of FIG. 2, are illustrative only. In addition, to facilitate the understanding of the device and its operation, a table of nomenclature is included at the end of this specification.

The self-propelled vehicle 10 is formed by a chassis 11 in which are mounted parallel positioned wheels $W_1$ and $W_2$ that constitute the driving instrumentalities or elements of the device. In addition, the chassis is supported in the rear by a supporting element in the form of a wheel $W_3$. It will be apparent that the supporting element $W_3$ can take a wide variety of other forms and may be supplemented by additional support elements, and also that the disposition of the driving wheels $W_1$ and $W_2$ shown at the front of the vehicle can be positioned in a wide variety of ways, for example, at the rear.

The driving wheels $W_1$ and $W_2$ are controlled by respective motors $M_1$ and $M_2$. The latter are, in turn, operated from a command module 12 which is in turn controlled by a user or operator from a control module 13.

For the particular self-propelled vehicle 10 in FIG. 1 the command module 12 is linked with the command module 13 by a transmitter-receiver channel. It will be understood that where desired the control module 13 may be mounted directly on the vehicle 10 and connected directly to the command module 12.

The specific controls illustrated in FIG. 1 for the operation of the control module 13 are accessible to the operator by a series of manually manipulatable knobs $m_1$ through $m_4$. The exact functioning of the control knobs $m_1$ through $m_4$ is explained in detail in conjunction with the block and schematic diagram of FIG. 2. For the present it is sufficient to note that the control signal dispatched from the control module 13 to the command module 12 acts upon the command module 12 to provide driving signals for the motors $M_1$ and $M_2$. This results in the operation of the driving wheels $W_1$ and $W_2$ in a random fashion. The consequence is that the self-propelled vehicle 10 executes a wide variety of movements which are illustrated, for example, by the arrow $K_{oo}$ corresponding to the situation where the trajectory is an arc with an infinite radius of curvature, and for example, the arc $K_R$ which corresponds to the situaton where the vehicle executes a movement with a radius of curvature R.

It will be appreciated that while the self-propelled vehicle 10 in FIG. 1 has been illustrated with an electric motor control, the invention also applies to those situations where the driving power is supplied in more conventional fashion, i.e., by internal combustion engines.

The mode of control exercised in the course of the invention is illustrated by considering the block and schematic diagram of FIG. 2 with the self-propelled vehicle 10 of FIG. 1. As indicated in FIG. 2, the wheels $W_1$ and $W_2$ of the vehicle of FIG. 1 are operated by separate motors $M_1$ and $M_2$. The control signals for the motors $M_1$ and $M_2$ come from the command module 12. The core element of the module 12 is a random signal generator F which provides, illustratively, four binary outputs $s_1$, $s_2$, $s_3$, and $s_4$ that are commuted and independent. The outputs of the random signal generator are supplied in pairs $s_1$, $s_2$ and $s_3$, $s_4$ to respective adder-subtractors $n_1$ and $n_2$. Since two binary signals provide a possibility of three signal representations and zero, and since the binary signals are supplied to adder-subtractors $n_1$ and $n_2$, the signals from the random signal generator produce a random sequence of binary signals which can range between the value of $-3$ and $+3$, for the particular mode of realization presented in FIG. 2. It will be appreciated that the random signal generator F may alternatively be of the analog type using a commutator to provide independent feeds for the ultimate control of the motors $M_1$ and $M_2$.

The outputs of the adder-subtractors $n_1$ and $n_2$ are applied to respective multipliers $F_o n_1$ and $F_o n_2$. These multipliers also receive signals from an oscillator $F_o$. Consequently the output of the multiplier is the product of the binary sequence signal from the adder-subtractors $n_1$ and $n_2$ and the signals from the oscillator $F_o$. The respective multiplied signals are applied to convertors $A_1$ and $A_2$ which convert them to a form suitable for driving the motors $M_1$ and $M_2$. When the oscillator operates at a fixed frequency, the motors operate at a speed which is controlled by their binary signal multipliers having values between $-3$ and $+3$. Accordingly, the speeds that are possible for the motors $M_1$ and $M_2$, taking into account the effect of the adder-subtractors $n_1$ and $n_2$ are the following:

$$-v_{max}, -\tfrac{2}{3}v_{max}, -\tfrac{1}{3}v_{max}, 0, \tfrac{1}{3}v_{max}, \tfrac{2}{3}v_{max}, v_{max}.$$

In this case $v_{max}$ is proportional to $3F_o$. The frequency of the oscillator is controlled from the control console 13 by the knob $m_1$ as indicated.

The command module 12 additionally includes a comparator C to allow the user to regulate the various durations of time that apply to the various signal sequences which control the motors $M_1$ and $M_2$. In the particular case illustrated, the controls are over three durations, T, $T_{oo}$, and $T_a$, by the use of manual control $m_2$, $m_3$, and $m_4$. The comparator compares the binary signals from the respective adder-subtractors $n_1$ and $n_2$ and controls automatically the frequency of the signals produced by the generator F for values $1/T$, $1/T_{oo}$, or $1/T_a$ determined by the utilizer.

There are three types of functioning:

When $v_1$ does not equal $v_2$, that is to say when the output of $n_1$ does not equal $n_2$ one of the trajectories has a curvature determined by the control $m_2$ with a duration of at least T. This situation includes the case where $v_1$ is equal to $-v_2$ when the vehicle pivots on itself and the trajectory of the radius is a null (a point);

Another case is when $v_1$ is equal to $v_2$ but not equal to zero, that is to say the outputs of $n_1$ and $n_2$ are equal but not zero in which case the trajectory is a straight line with an average duration $T_{oo}$.

Another situation is the particular case when $v_1$ is equal to $v_2$ is equal to zero, that is to say when the output of $n_1$ and $n_2$ are zero and this corresponds to a complete stopping of the vehicle during an average time $T_a$.

The other regulator mechanism $m_1$, which is independent of the other three, is to control the frequency of the block oscillator $F_o$ which permits determination of the value $v_{max}$ by a manual command $m_1$. It is to be noted that within the control module 13 provision can be made for allowing the various times controlled by the knobs $m_2$ through $m_4$ to vary in a random fashion and provision can also be made for controlling the dispersion of the average control time about its average value as well as for controlling the dispersion when the times themselves vary in a random fashion.

While various aspects of the invention have been set forth by the drawings and specification, it is to be noted that the foregoing detailed description is for illustration only and that various changes in parts as well as the substitution of equivalent constituents for those shown and described may be made without departing from the spirit and scope of the invention as set forth in the appended claims.

| | NOMENCLATURE |
|---|---|
| F | Random signal generator |
| $F_o$ | Oscillator |
| $s_1, s_2, s_3, s_4$ | Outputs for the random signal generator F |
| $n_1, n_2$ | Adder-subtractors |
| $F_o n_1, F_o n_2$ | Multipliers |
| $A_1, A_2$ | Conventers |
| $M_1, M_2$ | Driving Motors |
| $m_1, m_2, m_3, m_4$ Manual Controls | |
| C | Comparator |
| $W_1, W_2$ | Driving Wheels |
| $K_R, K_{oo}$ | Illustrative Trajectories |
| d | distance between driving wheels |
| R | Illustrative radius of curvature |
| 10 | Self-propelled random vehicle |
| 11 | Chassis for vehicle |
| 12 | Command module |
| 13 | Control module |

What is claimed is:

1. A random motion mechanism comprising at least one driving element in the form of a drive wheel, a random signal generator for generating a randomly varying set of signals, and means responsive to the signals from said random signal generator for operating said drive wheel with randomly varying speeds.

2. A mechanism as described in claim 1 in the form of a self-propelled randomly movable vehicle wherein the vehicle includes a second wheel in parallel with the first wheel and a support.

3. A vehicle according to claim 2 further including comparator means for predetermining the average duration of the lapse of time during which the driving element adopts a predetermined speed.

4. A vehicle according to claim 3 further including control module means for determining the average dispersion of said lapse of time.

5. A vehicle according to claim 2 wherein there are two driving wheels which propel the vehicle along a straight trajectory.

6. A vehicle according to claim 2 wherein there are two driving wheels which operate to produce rotation of the vehicle in place about a vertical axis.

7. A vehicle according to claim 2 wherein there are two driving wheels which are driven to produce a null speed corresponding to a complete stop.

8. A vehicle according to claim 2 wherein there are two driving wheels which operate at different speeds having a constant ratio providing a circular trajectory.

9. A vehicle according to claim 2 wherein there are two driving wheels which are driven to propel the vehicle along one of a plurality of trajectories corresponding to the following:
   a straight trajectory where the speeds of the driving wheels are equal;
   a pivoting in place where the driving wheels rotate at the same speed in opposite directions;
   a complete stop where the driving wheels are stopped; and a circular trajectory where the driving wheels rotate in the same direction at different speeds.

10. A vehicle according to claim 2 wherein there are two driving wheels each associated with a distinct motor.

11. A vehicle according to claim 2 wherein the random signal generator provides a plurality of commuted and independent binary outputs.

12. A mechanism according to claim 1 wherein the driving element is commanded by electrical signals which have random variations.

13. A mechanism according to claim 1 wherein the driving element is commanded by a frequency signal with chance variations.

14. A random motion mechanism according to claim 1 further including a second wheel which is also operated with randomly varying speeds.

* * * * *